United States Patent
Li et al.

(10) Patent No.: US 9,310,659 B2
(45) Date of Patent: Apr. 12, 2016

(54) COLORFUL LIQUID CRYSTAL THIN FILM, METHOD OF MANUFACTURING THEREOF AND DISPLAY DEVICE

(75) Inventors: Mingchao Li, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 206 days.

(21) Appl. No.: 13/473,194

(22) Filed: May 16, 2012

(65) Prior Publication Data

US 2012/0295039 A1 Nov. 22, 2012

(30) Foreign Application Priority Data

May 17, 2011 (CN) .......................... 2011 1 0126865

(51) Int. Cl.
| | | |
|---|---|---|
| B29D 11/00 | (2006.01) | |
| G02F 1/137 | (2006.01) | |
| G02B 5/28 | (2006.01) | |
| G02F 1/1335 | (2006.01) | |

(52) U.S. Cl.
CPC *G02F 1/137* (2013.01); *G02B 5/28* (2013.01); *G02F 1/133514* (2013.01); *G02F 1/133516* (2013.01); *G02F 2001/13775* (2013.01); *G02F 2001/13793* (2013.01); *G02F 2001/133521* (2013.01); *Y10T 428/10* (2015.01)

(58) Field of Classification Search
CPC .............. G02F 1/137; G02F 1/133514; G02F 1/133516; G02B 5/28; Y10T 428/10
USPC ................ 264/1.36, 1.38, 435, 436, 494, 496
See application file for complete search history.

(56) References Cited

U.S. PATENT DOCUMENTS

| 6,014,194 | A | 1/2000 | Kuo et al. | |
|---|---|---|---|---|
| 6,157,425 | A | 12/2000 | Kuo et al. | |
| 2002/0130993 | A1* | 9/2002 | Ichihashi et al. | 349/106 |
| 2008/0002110 | A1 | 1/2008 | Choi | |
| 2010/0103366 | A1 | 4/2010 | Farrand et al. | |
| 2010/0245724 | A1 | 9/2010 | Nishi et al. | |
| 2010/0315585 | A1* | 12/2010 | Chien et al. | 349/201 |
| 2014/0160414 | A1 | 6/2014 | Kubota et al. | |

FOREIGN PATENT DOCUMENTS

| CN | 1790118 A | 6/2006 |
|---|---|---|
| CN | 101007949 A | 8/2007 |
| CN | 101097343 A | 1/2008 |
| EP | 1 286 188 A2 | 2/2003 |
| JP | 11-183881 A | 7/1999 |

(Continued)

OTHER PUBLICATIONS

KIPO Office Action dated Jul. 31, 2013; Appln. No. 10-2012-0052642.

(Continued)

*Primary Examiner* — Mathieu Vargot
(74) *Attorney, Agent, or Firm* — Ladas & Parry LLP

(57) ABSTRACT

The disclosed technology relates to a colorful liquid crystal thin film, a method of thereof and a display device. An embodiment of the method of manufacturing a colorful liquid crystal thin film comprises: adjusting a voltage applied across a liquid crystal cell filled with blue phase liquid crystal until the liquid crystal cell shows a required color; and radiating a portion of the liquid crystal cell needed to show the required color by ultraviolet rays.

10 Claims, 4 Drawing Sheets

(56) References Cited

FOREIGN PATENT DOCUMENTS

| JP | 2003-073669 A | 3/2003 |
|---|---|---|
| JP | 2003-207615 A | 7/2003 |
| JP | 2010-048907 A | 3/2010 |
| JP | 2010-510256 A | 4/2010 |
| KR | 20080095119 A | 10/2008 |
| KR | 20100108213 A | 10/2010 |
| KR | 20100129200 A | 12/2010 |

OTHER PUBLICATIONS

Miyoung Kim, et al; "Effects of stabilization temperatures on electro-optic characteristics of polymer-stabilized optically isotropic liquid crystals", Current Applied Physics, vol. 10, pp. e113-e117; Available online Jun. 30, 2010.

Shin-Ying Lu, et al; "Electrically switched color with polymer-stabilized blue-phase liquid crystals", Optics Letters, vol. 35, No. 4, Feb. 15, 2010, pp. 562-564; XP-001552163.

Extended European Search Report; dated Aug. 16, 2012; Appln. No. 12168304.9-2205.

First Chinese Office Action dated Mar. 5, 2014 Appln No. 201110126865.9.

Korea Notice of Rejection Decision dated Feb. 27, 2014 Appln. No. 10-2012-0052642.

KIPO NOA dated Apr. 8, 2014; Appln. No. 10-2012-0052642.

Japanese Office Action dated Nov. 16, 2015; Appln. No. 2012-113361.

\* cited by examiner

COLORFUL LIQUID CRYSTAL THIN FILM, METHOD OF MANUFACTURING THEREOF AND DISPLAY DEVICE

BACKGROUND

One or more embodiments of the disclosed technology relates to a colorful liquid crystal thin film, a method of thereof and a display device.

Currently, the technology for the flexible display is gradually advanced. The colorful liquid crystal thin film is formed of a cholesteric liquid crystal material in most flexible display devices. A method for forming a colorful liquid crystal thin film by using a cholesteric liquid crystal material comprising the following steps.

Step S101 of rendering the liquid crystal thin film to show a red color by setting the temperature to a first temperature. The first temperature is about 25° C., for example.

Step S102 of radiating the region needed to be manufactured as a red region by ultraviolet irradiation to fix liquid crystal in this region, as shown in FIG. 1.

Step S103 of rendering the liquid crystal thin film in a region where liquid crystal is not fixed to show a green color by setting the temperature to a second temperature. The second temperature is about 34° C., for example.

Step S104 of radiating a region needed to be manufactured as a green region by ultraviolet irradiation to fix the liquid crystal in this region, as shown in FIG. 2.

Finally, the liquid crystal thin film with red and green colors is manufactured.

SUMMARY

An embodiment of the disclosed technology provides a method of manufacturing a colorful liquid crystal thin film, comprising: adjusting a voltage applied across a liquid crystal cell filled with a blue phase liquid crystal until the liquid crystal cell shows a required color; and radiating a portion of the liquid crystal cell needed to show the required color by ultraviolet rays.

Another embodiment of the disclosed technology provides a colorful liquid crystal thin film, comprising: substrates; and a mixture of a polymerizable blue phase liquid crystal and a photoinitiator uniformly coated on one of the substrates, wherein a pitch of the mixture of the polymerizable blue phase liquid crystal and the photoinitiator is adjusted to a required pitch under an applied electrical field and then is fixed by ultraviolet radiation so that the colorful liquid crystal thin film shows the required color.

Further another embodiment of the present disclosed technology provides a display device, comprising: an array substrate; an opposing substrate; and a colorful liquid crystal thin film, interposed between the array substrate and the opposing substrate, wherein the colorful liquid crystal thin film is the colorful liquid crystal thin film according to an embodiment of the disclosed technology.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Figure 1:
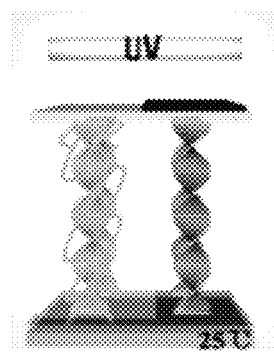
FIG. 1 is a principle view of manufacturing the colorful liquid crystal thin film in the related art.
Figure 2:
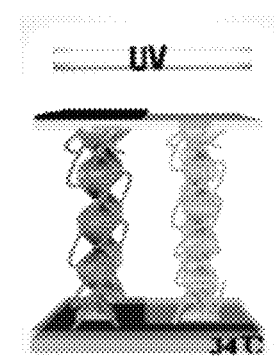
FIG. 2 is a principle view of manufacturing the colorful liquid crystal thin film in the related art.

One or more embodiments of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the accompanying claims.

The inventors has found that, in the traditional manufacturing process of a colorful liquid crystal thin film, it is difficult to exactly control the temperature and manufacture the colorful liquid crystal thin film with standard colors, the manufacturing efficiency is relatively low and the number of the colors is relatively small.

Blue phase is a phase that is between a liquid crystal phase and an isotropy state, and a blue phase liquid crystal can show some colors in the range of visible light blue phase liquid crystals can be divided into small molecular blue phase and polymer blue phase liquid crystals, in which polymer blue phase liquid crystals have gotten more attention because wide stable range.

Embodiments of the disclosed technology provide a colorful liquid crystal thin film, a method of manufacturing the colorful liquid crystal thin film, and a display device. The colorful liquid crystal thin film can be manufactured with a polymer-stabilized blue phase liquid crystal, the liquid crystal can be twisted under applied electric fields to show different colors and then fixed by ultraviolet radiation. In an embodiment of the disclosed technology, it is easier to twist liquid crystal molecules under applied electric fields than by controlling the temperature, thus the manufacturing efficiency of the colorful liquid crystal thin film can be improved and it is easy to control colors that the colorful liquid crystal thin film is intended to show. In addition, in the embodiments of the disclosed technology, the colorful liquid crystal thin film with more kinds of colors can be manufactured by applying different electric fields.

A method for manufacturing a colorful liquid crystal thin film according to an embodiment of the disclosed technology comprising the following steps.

Step S401 of adjusting a voltage applied across a liquid crystal cell filled with a blue phase liquid crystal material until the liquid crystal cell show a required color; and Step S402 of radiating a portion needed to show the required color in the liquid crystal cell by ultraviolet radiation to fix the liquid crystal.

Because the blue phase liquid crystal can be twisted under an applied electric field to make the color of the light transmitted through the liquid crystal changed, the liquid crystal cell can show a desired color by adjusting the voltage applied across the liquid crystal cell filled with the blue phase liquid crystal, and then, the pitch of the liquid crystal can fixed by radiating the liquid crystal with ultraviolet radiation so that when the electric field is removed, the colorful liquid crystal thin film still show the required color in the region intended to show the desired color.

The applied voltage may be in the range of 30~100V, for example; the value of the voltage may be proportional to the content of chirality groups in polymerization monomers. With increase of the content of chirality groups, the polymerization system may appear in blue, green, and red colors, for example. In one example, when the content of chirality groups in the system is 18~22%, 23~27%, and 28~30%, the system may appear in blue, green, and red, respectively.

With respect to the different kinds of blue phase liquid crystal materials, the voltages of the applied electric field for rendering the colorful liquid crystal thin films to show a same color may be different, thus in operation, the voltages can be adjusted by gradually increasing or decreasing until the liquid crystal cell shows a required color. In addition, with regard to a certain kind of blue phase liquid crystal materials, a voltage range may be determined based on operation experience in order to decrease the time needed to adjust the voltages, so that the efficiency of manufacturing the colorful liquid crystal thin film can be improved.

Further, in order to fix the pitch of a blue phase liquid crystal material to the currently required pitch after the liquid crystal cell shows the required color and make a color of the liquid crystal cell to be closer to the required color, the period and intensity for the ultraviolet irradiation can be determined by tests. More preferably, a mercury lamp may be used to radiate the portion of the liquid crystal cell required to show the currently required color before the ultraviolet irradiation is used to radiate the portion of the liquid crystal cell. Thus, the pitch of the blue phase liquid crystal may be quickly fixed to the currently required pitch during the mercury lamp radiation; then, by radiating ultraviolet rays, the blue phase liquid crystal molecules can be polymerized to fix the liquid crystal.

In an example, after the mercury lamp is radiated for about 5-15 minutes, an initial fixing of the liquid crystal material is completed; and more preferably, the mercury lamp radiation time is about 10 minutes, and the fixing effect is better.

When the ultraviolet ray or the mercury lamp is used to radiate a portion of the liquid crystal cell required to show a required color, the portion of the liquid crystal cell required to show the currently required color can be exposed but the rest portion of the liquid crystal cell ca be covered or shield for example, and thus, the ultraviolet rays or the mercury lamp may radiate total liquid crystal cell and liquid crystal in the portion of the liquid crystal cell required to show the currently required color can be fixed. For example, a prepared mask can be used to cover the rest portion of the liquid crystal cell.

In an embodiment of the disclosed technology, a method for filling a blue phase liquid crystal into a liquid crystal cell comprises the following steps.

Step S501 of mixing a polymerizable blue phase liquid crystal and a photoinitiator, heating the mixture to a clear point and then cooling. For example, the mixture may be cooled to a room temperature and then is prepared for usage.

Step S502 of providing by coating uniformly the mixture of the polymerizable blue phase liquid crystal and the photoinitiator on a glass substrate. This glass substrate may be a conductive glass substrate formed with electrode patterns. Further, other kinds of substrate such as plastic substrates and silica substrates can be used.

In one example, the polymerizable blue phase liquid crystal may be, for example, formed by processing a blue phase liquid crystal to have polymerizability. In another example, the polymerizable blue phase liquid crystal may be formed by mixing a blue phase liquid crystal and a reactive mesogen (RM).

Any common photoinitiator, such as, Irgacure 651, may be used as the photoinitiator in the method, or any other kind of photoinitiator may be selected based on the practice and tests.

A polymerizable blue phase liquid crystal may comprises polymerizable double bond, triple bond, or other groups (e.g., carboxyl, hydroxy, amino group, etc.), and can undergo a polymerization action to form a stable system under the effect of an photoinitiator. The blue phase liquid crystal system includes polymerizable groups, chirality groups, rigid structures, and flexible structures. For example, the polymerizable groups and chirality groups may be contained in the rigid structures and flexible structures. A photoinitiator can absorb energy at a certain wavelength for example in the ultraviolet light range (250~420 nm) or visible light range (400~800 nm) to generate free radicals, positive ions, etc to trigger polymerization and crosslinking of monomers.

The examples of the polymerizable functional groups (PFG) in the blue phase liquid crystal system may include $HOOC-(CH_2)_n-$, $NH_2-(CH_2)_n-$, $HO-(CH_2)_n-$, $HC=CH-(CH_2)_n-$, $HC\equiv C-(CH_2)_n-$, and so on.

The examples of the rigid structure (RS) may include

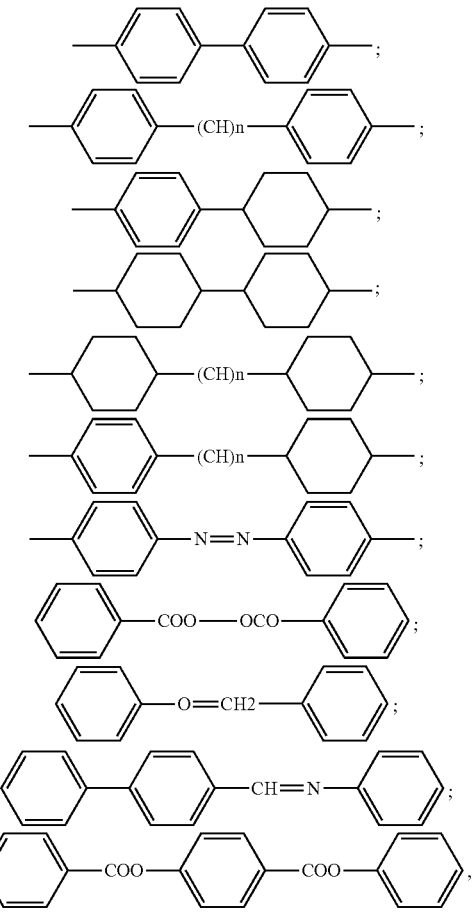

and the like or other stable chemical structure with rigid properties and containing 5- or 6-membered rings or combination thereof.

Chiral group (CG) refers to a general class of substances with a chiral structure, which can be a natural compound with chirality such as cholesterin

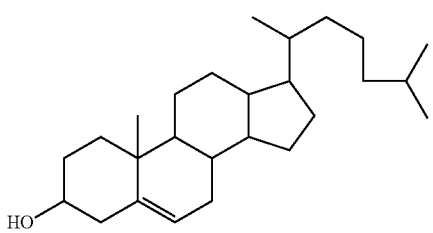 [SMILES: CC(C)CCCC(C)C1CCC2C1CCC1C2CC=C2CC(O)CCC21C]

and derivates thereof, peppermint camphor

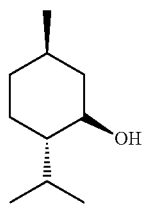

and derivates thereof, or a synthesized compound designed to have a chiral centre.

As discussed above, the basic structure of the mentioned blue phase molecule can be designed as follows: FG-RS-CG, (FG: flexible group). Since PFG can be included in RS or FG, and CG can be in FG, PFG or a group thereof, the order of RS and CG as well as the chemical bonds connected thereto can be varied. In another example, the above functional groups can be present in the different molecules, one or more of which contain the liquid crystal molecules, and exhibit the properties of a blue phase liquid crystal when mixing.

In step S502, spin-coating may be used to coating uniformly the mixture of the polymerizable blue phase liquid crystal and the photoinitiator on a glass substrate. Generally, an upper substrate, a lower substrate and the blue phase liquid crystal mixture filled between the substrates constitutes a liquid crystal cell. For example, preferably, a width of the liquid crystal cell is not more than 10 μm, and the width may be in a range of 3 μm-6 μm. The upper and lower substrates may be conductive glass substrate.

Hereinafter, an example of the method for manufacturing the colorful liquid crystal thin film according to an embodiment of the disclosed technology, the method comprising the following steps.

Figure 3A:
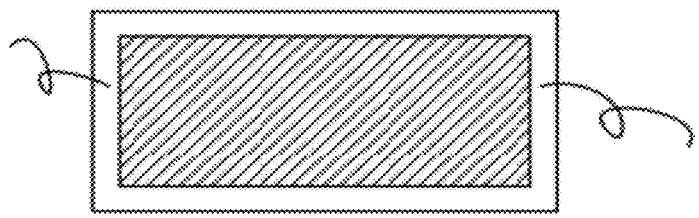
FIG. 3a-FIG. 3j are a schematic views for showing states during a process of manufacturing the red, green and blue liquid crystal thin film according to an embodiment of the disclosed technology.
Figure 3B:
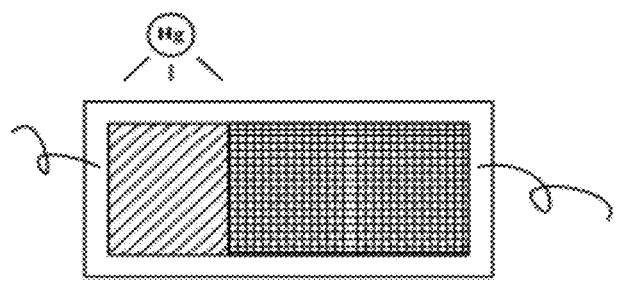
Figure 3C:
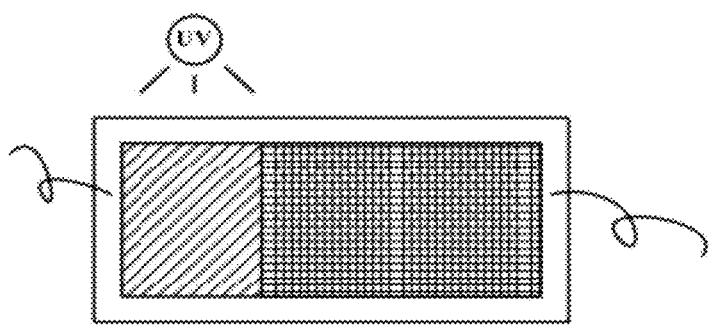
Figure 3D:
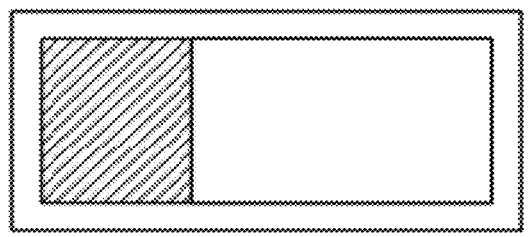
Figure 3E:
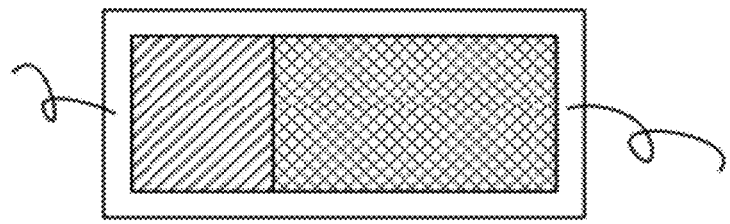
Figure 3F:
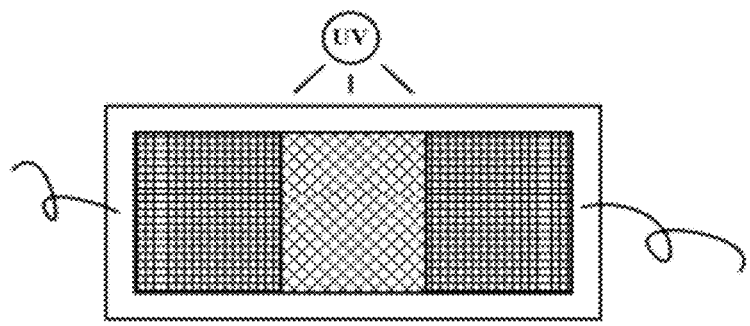
Figure 3G:
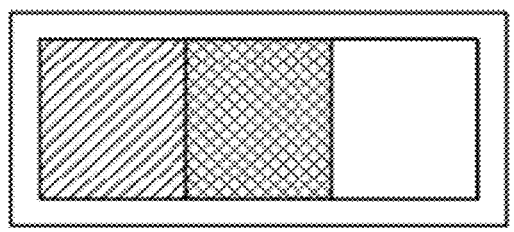
Figure 3H:
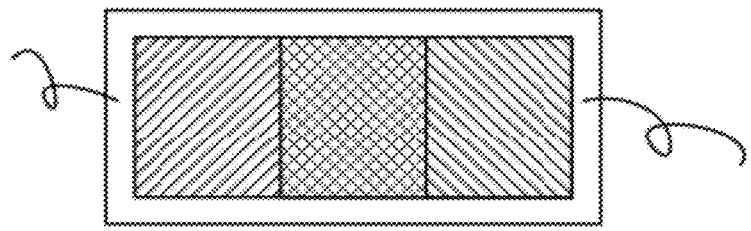
Figure 3I:
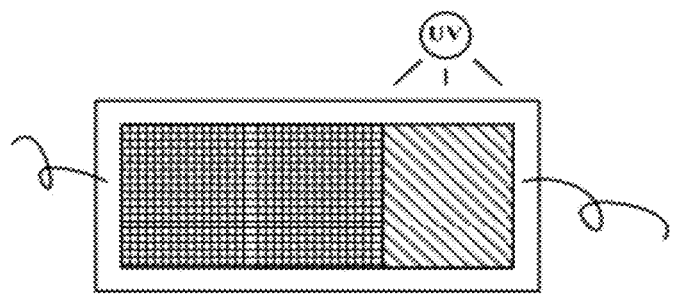
Figure 3J:
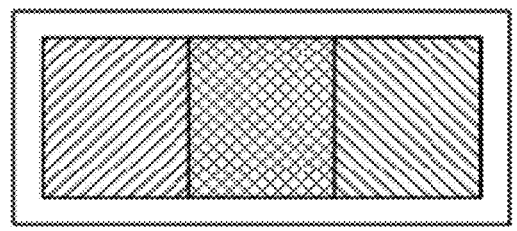

Step S601 of mixing a polymer-stabilized blue phase liquid crystal (e.g., right-handedness), an RM and a photoinitiator (e.g., Irgacure651), heating the mixture to a clear point and then cooling;

Step S602 of spin-coating the mixture obtained in step S601 on a conductive glass substrate, wherein a width of each of upper and lower substrates is 3 μm-6 μm for example;

Step S603 of applying a voltage across the liquid crystal cell and adjusting the voltage of the liquid crystal cell to make the liquid crystal cell to show a red color, as shown in FIG. 3a;

Step S604 of covering a mask on the liquid crystal cell and exposing the region required to show the red color, and radiating the liquid crystal cell for 10 minutes for example with a mercury lamp to fix the pitch of the liquid crystal in the red region, as shown in FIG. 3b;

Step S605 of radiating the liquid crystal cell by ultraviolet radiation to promote the polymerization of RM for fixing the liquid crystal in the region required to shown the red color, as shown in FIG. 3c;

Step S606 of stopping applying the voltage until other region returns to a clear state for example the initial state, as shown in FIG. 3d;

Step S607 of applying another voltage to the clear region to show a green color, as shown in FIG. 3e;

Step S608 of covering another mask on the liquid crystal cell and exposing the region required to show the green color, and radiating the liquid crystal cell for 10 minutes for example with a mercury lamp to fix the pitch of the liquid crystal cell in the green region;

Step S609 of radiating the liquid crystal cell by ultraviolet radiation to promote the polymerization of RM in order to fix liquid crystal in the green region, as shown in FIG. 3f;

Step S610 of stopping applying the voltage until other region (other than the red, green regions) returns into a clear state for example an initial state, as shown in FIG. 3g;

Step S611 of applying further another voltage to the clear region to show a blue color, as shown in FIG. 3h;

Step S612 of covering further another mask on the liquid crystal cell and exposing the region required to show the blue color, and radiating the liquid crystal cell for 10 minutes for example with a mercury lamp to fix the pitch of the liquid crystal cell in the blue region;

Step S613 of radiating the liquid crystal cell by ultraviolet radiation to promote the polymerization of RM in order to fix liquid crystal in the blue region, as shown in FIG. 3i; and Step S614 of stopping to apply the voltage and obtaining a colorful liquid crystal thin film with red, green and blue colors, as shown in FIG. 3j.

Figure 4:
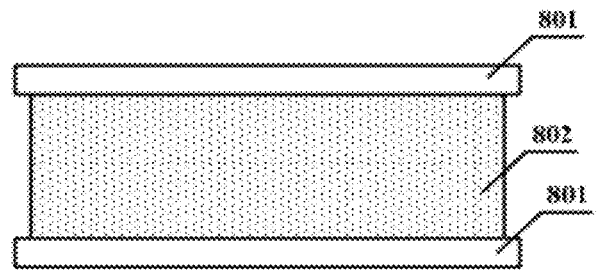
FIG. 4 is a schematic structural view of the colorful liquid crystal thin film according to an embodiment of the disclosed technology.

Further an embodiment of the disclosed technology provides a colorful liquid crystal thin film, the colorful liquid crystal thin film is manufactured by a method according to an embodiment of the disclosed technology, as shown in FIG. 4, for example. The colorful liquid crystal thin film comprising: conductive glass substrates 801; a mixture 802 of a polymerizable blue phase liquid crystal and a photoinitiator uniformly provided on one of the conductive glass substrates 801. In addition, the pitches of the mixture of the polymerizable blue phase liquid crystal and the photoinitiator have become the required pitches and then are fixed by ultraviolet radiation.

The polymerizable blue phase liquid crystal may be formed, for example, by processing a blue phase liquid crystal to have polymerizability or by mixing the blue phase liquid crystal and RM (reactive mesogen).

In another embodiment of the disclosed technology, a display device is provided, and the display device comprises a colorful liquid crystal thin film provided by an embodiment of the disclosed technology, and the display device may be a liquid crystal display or another kind of display devices. The display device comprises an array substrate and an opposing substrate, wherein the colorful liquid crystal thin film is provided between the array substrate and the opposing substrate, and driving elements are disposed on the array substrate.

One or more embodiments of the disclosed technology provide a method of manufacturing a colorful liquid crystal thin film, a colorful liquid crystal thin film and a display device. The colorful liquid crystal thin film is manufactured by a polymer-stabilized blue phase liquid crystal, the liquid crystal can be twisted under applied electric fields in order to show different colors and then fixed by ultraviolet radiation. The liquid crystal can twisted under the electric fields, the control of the electric fields are easier than the control of the temperatures, so the manufacturing efficiency of the colorful liquid crystal thin film can be improved and it may be easy to control the color of a color of the colorful liquid crystal thin film. In addition, the colorful liquid crystal thin film with more colors can be manufactured by applying the different electric field.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the following claims.

What is claimed is:

1. A method of manufacturing a colorful liquid crystal thin film, comprising:
   adjusting a voltage applied across a liquid crystal cell filled with a blue phase liquid crystal until the liquid crystal cell shows a first required color;
   radiating a first portion of the liquid crystal cell needed to show the first required color by a mercury lamp and then radiating the first portion of the liquid crystal cell needed to show the first required color by ultraviolet rays, while the voltage is maintained across the liquid crystal cell, a pitch of the blue phase liquid crystal in the first portion of the liquid crystal cell being adjusted and fixed accordingly;
   suspending applying the voltage across the liquid crystal cell until a remaining portion of the liquid crystal cell returns to a clear state, while the first portion of the liquid crystal cell shows the first required color;
   reapplying and adjusting the voltage across the liquid crystal cell until the remaining portion of the liquid crystal cell shows a second required color, while the first portion of the liquid crystal cell shows the first required color; and
   radiating a second portion of the liquid crystal cell needed to show the second required color by ultraviolet rays, the second portion being at least part of the remaining portion of the liquid crystal cell.

2. The method according to claim 1, wherein the radiating the first portion of the liquid crystal cell needed to show the first required color by the ultraviolet rays comprises:
   exposing the first portion of the liquid crystal cell needed to show the first required color and covering the remaining portion; and
   radiating the liquid crystal cell with the ultraviolet rays.

3. The method according to claim 1, wherein the radiating the first portion of the liquid crystal cell needed to show the first required color by the mercury lamp comprises:
   exposing the first portion of the liquid crystal cell needed to show the first required color and covering a rest portion; and
   radiating the liquid crystal cell by the mercury lamp.

4. The method according to claim 1, wherein the radiating the first portion of the liquid crystal cell needed to show the first required color by the mercury lamp comprises:
   radiating the first portion of the liquid crystal cell needed to show the first required color by the mercury lamp for 5-15 minutes.

5. The method according to claim 1, further comprising:
   manufacturing the liquid crystal cell filled with the blue phase liquid crystal.

6. The method according to claim 5, wherein the manufacturing the liquid crystal cell filled with the blue phase liquid crystal comprises:
   mixing a polymerizable blue phase liquid crystal and a photoinitiator, heating the mixture to a clear point and then cooling; and
   providing the mixture of the polymerizable blue phase liquid crystal and the photoinitiator on a substrate.

7. The method according to claim 6, wherein the substrate is a conductive substrate.

8. The method according to claim 6, wherein the polymerizable blue phase liquid crystal is formed by processing the blue phase liquid crystal to have polymerizability or by mixing the blue phase liquid crystal and a reactive mesogen.

9. The method according to claim 7, wherein the polymerizable blue phase liquid crystal is formed by processing the blue phase liquid crystal to have polymerizability or by mixing the blue phase liquid crystal and a reactive mesogen.

10. The method according to claim 1, wherein the first required color is red or green.

* * * * *